United States Patent
Albou et al.

(10) Patent No.: US 8,348,485 B2
(45) Date of Patent: Jan. 8, 2013

(54) OPTICAL MODULE FOR A MOTOR VEHICLE CAPABLE OF SELECTIVELY LIGHTING A ZONE

(75) Inventors: Pierre Albou, Paris (FR); Jonathan Blandin, Les Pavillons sous Bios (FR); David Bourdin, Livry Gargan (FR); Jean-François Le Bars, Elchingen (DE); Boris Wiegand, Constance (DE)

(73) Assignee: Valeo Vision, Bobigny (FR)

( * ) Notice: Subject to any disclaimer, the term of this patent is extended or adjusted under 35 U.S.C. 154(b) by 466 days.

(21) Appl. No.: 12/569,946

(22) Filed: Sep. 30, 2009

(65) Prior Publication Data
US 2010/0091514 A1 Apr. 15, 2010

(30) Foreign Application Priority Data
Sep. 30, 2008 (FR) ...................... 08 05409

(51) Int. Cl.
*B60Q 1/02* (2006.01)
(52) U.S. Cl. .......................... 362/538; 362/507; 362/513
(58) Field of Classification Search .................. 362/283, 362/285, 464, 465, 507, 513, 538, 539
See application file for complete search history.

(56) References Cited

U.S. PATENT DOCUMENTS

| | | | |
|---|---|---|---|
| 6,857,768 B2 * | 2/2005 | Watanabe et al. ............. | 362/512 |
| 7,201,505 B2 | 4/2007 | Sugimoto | |
| 7,347,602 B2 | 3/2008 | Fleury et al. | |
| 7,568,825 B2 * | 8/2009 | Louvet et al. ................. | 362/539 |
| 7,618,170 B2 * | 11/2009 | Sugiyama et al. ............ | 362/510 |
| 7,736,037 B2 * | 6/2010 | Losak et al. .................. | 362/539 |
| 2005/0201117 A1 | 9/2005 | Sugimoto | |
| 2005/0225996 A1 | 10/2005 | Fleury et al. | |
| 2006/0164852 A1 * | 7/2006 | Mochizuki et al. ........... | 362/539 |
| 2007/0217194 A1 | 9/2007 | Lee | |
| 2008/0117642 A1 | 5/2008 | Moizard et al. | |
| 2008/0180966 A1 | 7/2008 | Louvet | |

FOREIGN PATENT DOCUMENTS

| | | |
|---|---|---|
| DE | 102004033737 A1 | 2/2006 |
| DE | 102006043281 A1 | 3/2008 |
| EP | 0935728 A1 | 8/1999 |
| EP | 1584862 A1 | 10/2005 |
| EP | 1806531 A1 | 7/2007 |
| EP | 1818602 A2 | 8/2007 |
| EP | 1923262 A1 | 5/2008 |
| WO | 9913265 A1 | 3/1999 |
| WO | 2008037388 A2 | 4/2008 |

* cited by examiner

*Primary Examiner* — John A Ward
(74) *Attorney, Agent, or Firm* — Jacox, Meckstroth & Jenkins

(57) ABSTRACT

A headlamp for a motor vehicle, this headlamp comprising at least one optical module capable of emitting a plurality of light beams, including a low beam and at least one additional light beam. The optical module is equipped with a cover plate which can be moved between at least two positions, this movable cover plate being configured along a shaft mounted so as to rotate in the optical module and driven in rotation at least by a motor. The shaft comprises at least one first cut-off member configured as a double-edged cover plate providing an oblique cut-off for emission of the low beam, and at least one second cut-off member configured as a wall of substantially constant height, angularly offset relative to the first cut-off member and providing at least one substantially vertical cut-off line for emission of a high beam.

15 Claims, 3 Drawing Sheets

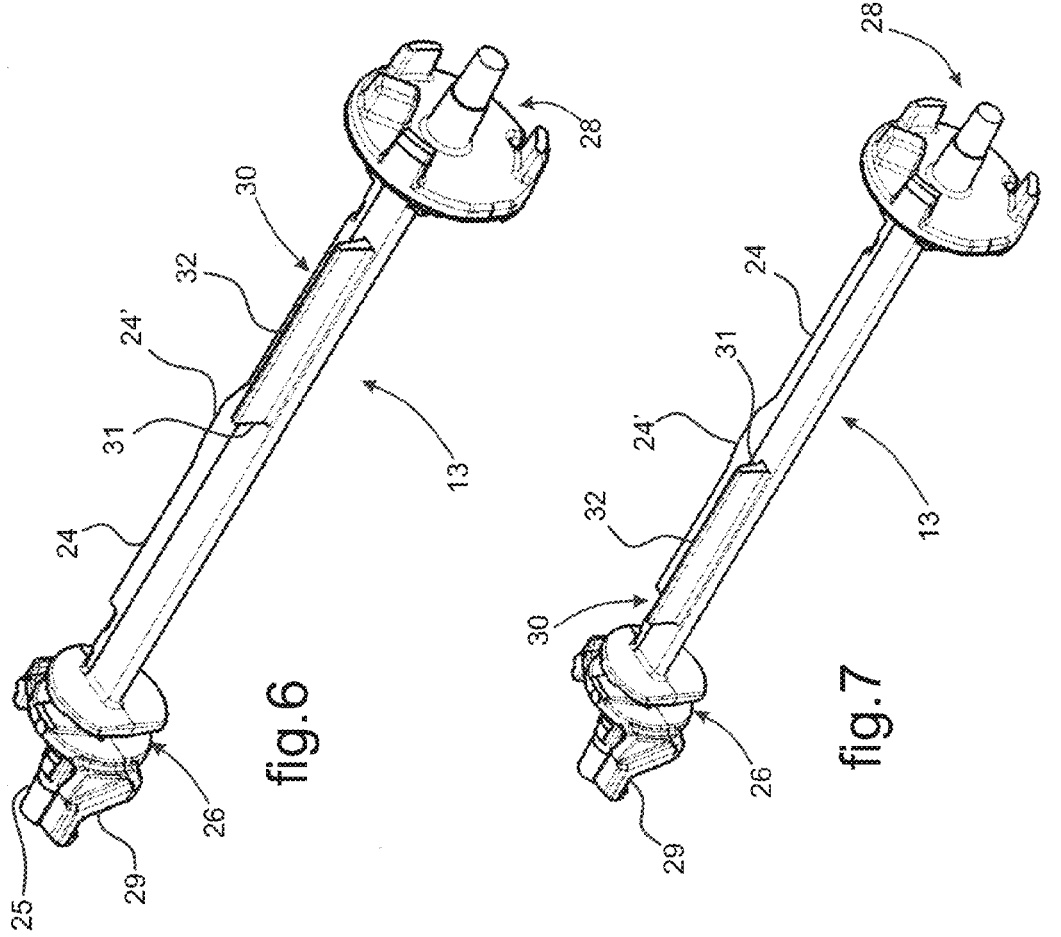
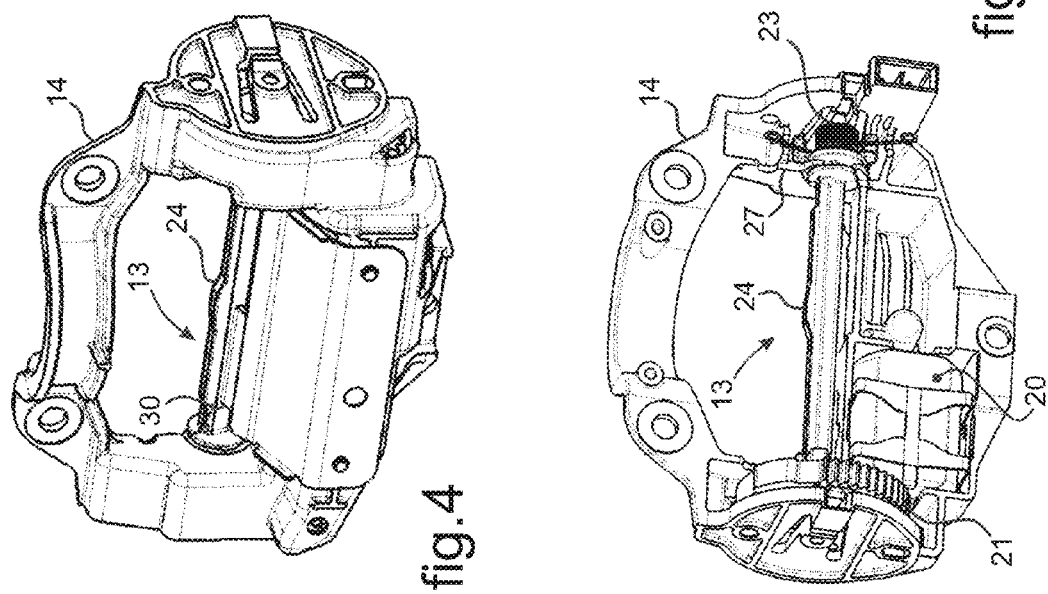

OPTICAL MODULE FOR A MOTOR VEHICLE CAPABLE OF SELECTIVELY LIGHTING A ZONE

CROSS-REFERENCE TO RELATED APPLICATIONS

This application claims priority to French Application No. 0805409 filed Sep. 30, 2008, which application is incorporated herein by reference and made a part hereof.

BACKGROUND OF THE INVENTION

1. Field of the Invention

The invention concerns the field of lighting devices, and more particularly the field of car headlamps comprising one or more optical modules, each optical module comprising at least one light source associated with optical elements in order to emit one or more types of light beams. The invention relates to a headlamp comprising at least one optical module, which is capable of selectively lighting a zone by means of a cut-off member of a light beam emitted by the module. The headlamp of the present invention is more particularly capable of optimizing the lighting of a zone excluding a changing space in which there is located a travelling vehicle whose driver must not be dazzled.

2. Description of the Related Art

Headlamps for a motor vehicle are generally composed of a housing which is closed by a transparent lens through which one or more light beams are emitted. This housing accommodates at least one lighting module, comprising principally a light source and an optical system capable of modifying at least one parameter of the light generated by the light source for emission of the light beam by the lighting module. The optical system comprises optical components consisting for example of a reflector, a lens, a diffusive element or a collimator, or any other optical component capable of modifying at least one of the parameters of the light generated by the light source, such as its average reflection and/or its direction. The lighting module or modules are likely to be jointly accommodated within the same optical module or to be distributed in headlamps/optical devices specifically dedicated thereto.

Known examples of optical modules for a car headlamp include "bifunctional" modules which are configured to emit from the same lighting module alternately two types of light beams in accordance with the required lighting conditions. One of these light beams is, for example, a, short-range, low beam for lighting the lane while avoiding dazzling another driver driving in a lane in the opposite direction of traffic or in a lane in the same direction of traffic, in the case of a vehicle being tailed or during overtaking for example. The other of the light beams is, for example, a long-range, high beam allowing optimization of the lighting provided by the headlamp if there is no driver who must not be dazzled. In order to switch from low beam to high beam and vice versa, the optical module is equipped with a cover plate, which is mounted so as to be able to move within the housing of the optical module, by being in particular interposed between the light source and a component of the optical system, such as a lens or the like. This movable cover plate is a beam cut-off cover plate which allows the low beam to be emitted based on a partial masking of the light beam emitted by the optical module, which would otherwise spread above the cut-off formed by the movable cover plate. Another known auxiliary function consists in a raising of the low beam, for emission of a motorway beam of intermediate range between that of the low beam and that of the high beam.

According to a simple embodiment, the movability of the cover plate makes it possible to pass between two positions, one for partially blocking the light beam emitted by the optical module in order to obtain the low beam, the other a retracted position in which the light beam emitted by the optical module is not masked in order to obtain the high beam. There have also been proposed more complex embodiments of the movable cover plate allowing various phases for blocking of the light beam emitted by the optical module. More particularly, the blocking or non-blocking of the light beam may be carried out gradually in various successive steps. The movable cover plate is for example embodied as a rotating arbor, the outer surface of which is in the form of an envelope having a continuous surface. Reference may be made for example to document EP-0 935 728 for this type of cover plate.

A drawback of this type of movable cover plate formed by an arbor having variable geometry consists in the complexity of its structure and its means for rotating. The precision imposed by the variation in the geometry of the drum makes it expensive to produce; this is undesirable. An additional constraint consists in the need for the default position of the movable cover plate to correspond to that of the low beam, resulting in a configuration of the movable cover plate and its movability means that must make allowance for this constraint. The mounting of the rotating arbor within the housing and repositioning thereof relative to the optical axes of the lighting module must be stringent, resulting in an increase in the complexity of the lighting module. As a result, the general embodiment and the modes of operation of a movable cover plate of this type, providing various phases for blocking the light beam emitted by an optical module between the emission of a low beam and the emission of a high beam, or even of a motorway beam, are capable of further improvement.

It is known to operate means for detecting the environment of a vehicle in order to automatically vary the light beams emitted by the optical modules fitted to the headlamp. Detection means of this type allow in particular the movable cover plate of a bifunctional optical module to be automatically maneuvered for emission of the low beam or the high beam in accordance with the traffic conditions, and in particular in the case of the presence of another vehicle whose driver must not be dazzled. The detection means are in particular of the optoelectronic type, such as a camera or similar equipment, and/or of the type for communicating by waves, such as satellite and/or cellular communication means, or else of the radar type. Various computation means can be associated with the detection means in order to correct the information which they provide and complete the information detected from the environment of the vehicle.

It is also known to improve night-sight driver comfort by adapting as required the range and/or the intensity of passing beams or high beams in order to optimize the potential lighting of the traffic lane. For example, there have been proposed what is known as a motorway light function and what is known as a town light function. These functions consist in modifying the range and/or the current light intensity of the passing beams, in accordance with the traffic lane in which the vehicle is driving and/or in accordance with the conditions for lighting the external environment of the vehicle. More particularly, when a vehicle is driving in a fast-moving lane, such as a motorway or similar traffic lane, it is expedient to increase the range of the passing beams, in order to make the emitted light beam carry effectively as far as possible (motorway light function). Conversely, it is expedient to reduce the range slightly and to widen the beams emitted by the passing beams when the vehicle is driving close to an externally lit environment, such as in an urban area for example (town light function). Reference may be made for example to patent EP-1 923 262, which is equivalent to U.S. 2008/0117642, which discloses embodiments for adapting the range of a beam emitted by a low beam.

Other functions have been proposed to modify the characteristics of a light beam emitted by an optical module in accordance with the configuration of the traffic lane. Known, for example, is the "bending light" (BL) function which can be broken down into what is known as a dynamic bending light (DBL) function and what is known as a fixed bending light (FBL) function. The bending light function allows the orientation of a light beam to be modified, in the case of DBL, or light to be added laterally by switching on one or more additional light sources in bends, in the case of FBL, in such a way that when the vehicle enters a bend, the road is better lit.

However, the optimization of the lighting provided by vehicle headlamps is limited by the various regulations relating to the driving of vehicles on public roads, in particular with regard to the ban on dazzling other users of car traffic lanes, regardless of whether they are driving in a lane in the opposite direction of traffic or in a lane in the same direction of traffic. Accordingly, designers in the field focus their efforts on research into lighting devices for a motor vehicle that offer a compromise between improved lighting for the driver, with better visual comfort, while at the same time not causing any inconvenience to other road users. It has for example been suggested, in patent application DE-102006043281, to use a movable cover plate of the type of that described in patent application EP-0 935 728 in order to obtain such a result by defining various beam cut-off zones obtained from the rotating arbor having variable geometry.

There is, therefore, a need to provide an optical module that provides improved lighting over the systems of the past.

SUMMARY OF THE INVENTION

The object of the present invention is to propose a lighting device or headlamp for a motor vehicle that is capable of selectively lighting a zone by means of a cut-off member of a light beam emitted by the device. The present invention seeks more particularly to improve the lighting of a zone excluding a changing space in which there is located another travelling vehicle whose driver must not be dazzled, regardless of whether this other vehicle is driving in a lane in the opposite direction or is a vehicle being tailed. Preferably, the headlamp, and in particular the embodiment of the optical modules which it contains, should have as simple a structure as possible, while ensuring in particular a default positioning corresponding to that of the low beam. In particular, the present invention seeks to propose a movable cover plate which has a simple structure and is easy to produce, and/or of which the embodiments for movability and for mounting within an optical module housing are structurally simple and easy to carry out.

The invention relates to a headlamp for a motor vehicle, this headlamp comprising at least one optical module capable of emitting a plurality of light beams, including a low beam and at least one additional light beam, the optical module being accommodated within a housing of the headlamp and combining a light source and an optical system, the optical module being equipped with a cover plate which can be moved between at least two positions, this movable cover plate being configured along a shaft mounted so as to rotate in the optical module and driven in rotation at least by a motor, the cover plate comprising a plurality of cut-off profiles of light beams emitted by the module. This rotating shaft comprises at least one first cut-off member configured as a double-edged cover plate providing an oblique cut-off for emission of the low beam, and at least one second cut-off member configured as a wall, preferably of substantially constant height, angularly offset relative to the first cut-off member and providing at least one substantially vertical cut-off line for emission of a high beam corresponding to a first additional light beam.

Preferably, the wall is a cut-off member, the substantially vertical edge of which provides a vertical amplitude cut-off line, for emission of a restricted lateral amplitude high beam which in fact forms the first additional light beam.

According to a first embodiment, in respective cut-off positions, the upper parts of the cut-off members of the rotating shaft are substantially positioned at the same height. The two types of beam thus have lower cut-off zones, corresponding to these upper edges, which are aligned or substantially aligned.

According to a second embodiment, in respective cut-off positions, the upper parts of the cut-off members of the rotating shaft are positioned at different heights. In this case, the lower cut-off zones are no longer aligned.

This vertical relative positioning between the edges/upper parts of the cut-off members may be adjusted by selecting the height of the wall and/or with the aid of the correction system fitted to the optical module.

Preferably, the wall is focused substantially on the optical axis of the lighting module. The cut-off corresponding to its upper edge is selected so as to have a height of preferably at least 0.5 mm or at least 0.6 mm, in particular at least 0.54 mm, with a focal lens of about 43 mm.

The rotating shaft can be maneuvered in rotation to a position corresponding to the emission of a second additional beam, which is either a high beam or a motorway beam.

The position of the rotating shaft corresponding to the emission of the low beam is an intermediate position between the positions of the rotating shaft corresponding respectively to the emission of the first additional light beam and to the emission of the second additional light beam.

The driving in rotation of the rotating shaft for passing from one to the other of the positions allocated for the emission of one or the other of the additional light beams can be carried out from the reference position corresponding to the emission of the low beam, and by driving in rotation of the rotating shaft in respective directions until the position for emission of the corresponding additional light beam is reached, these positions being stable positions maintained based on a placement in abutment of the rotating shaft counter to the driving thereof in rotation by the motor.

The motor for driving in rotation of the rotating shaft may be a DC motor, causing the optical module to pass from the position for emitting the low beam to any one of the other positions for emitting additional light beams.

The passing between any one of the positions of the rotating shaft corresponding to an additional light beam to the position corresponding to the low beam may be caused by a resilient return member, in particular following a modification of the steering of the electric control of the motor.

The driving in rotation of the rotating shaft to any one of its positions for emitting a dedicated light beam is associated with means for detecting the environment of the vehicle and with a bending light mechanism and/or with a roadway correction mechanism.

The motor is either a DC motor associated with a stops system linked to the rotating shaft or a stepper motor associated with a sensor(s) system.

The wall can have an upper edge, the rim of which is at least partly reflective or made reflective by a reflective coating, by depositing an aluminum layer for example. It is thus possible to add light in the upper part of the beam if that is appropriate.

According to one variant, the optical module according to the invention is a trifunctional module, with a rotating shaft provided with three cut-off members, in order to emit, depending on the position of the rotating shaft, a low beam, a high or motorway beam, and a restricted lateral amplitude high beam.

According to another variant, the optical module according to the invention is a quadrifunctional module, with a rotating shaft provided with four cut-off members, in order to emit, depending on the position of the shaft, a low beam, a high beam, a restricted lateral amplitude (RLA) high beam and a motorway beam.

The invention also relates to a pair of headlamps, intended to be mounted at the front of a vehicle, each of the headlamps comprising a trifunctional optical module as defined hereinbefore. Each of the optical modules can emit the same three beams, or not, in particular either the pair of headlamps makes provision for two headlamps each with a module emitting a low beam, a high or motorway beam, and a restricted lateral amplitude high beam, or the pair of headlamps makes provision for one headlamp having an optical module emitting a low beam, a high beam, and a restricted lateral amplitude high beam, and the other headlamp having an optical module (16) emitting a low beam, a motorway beam, and a restricted lateral amplitude high beam.

The invention also relates to a pair of headlamps intended to be mounted in a vehicle, combining, at the front of a vehicle, two headlamps as described hereinbefore, each of the optical modules fitted to the headlamps being capable of emitting a restricted lateral amplitude high beam, in such a way that the spacing between these two beams is adjustable as a function of the distance and/or the number of vehicles in the environment close to the vehicle equipped with the pair of headlamps.

More particularly, the rotating shaft mentioned hereinbefore comprises a constant global profile, such as a profile having a cylindrical section or having a polygonal, rectangular for example, section. The first cut-off member and the wall extend axially at least partially at the periphery of the rotating arbor, protruding radially relative thereto. The first cut-off member is capable of vertically limiting the angular range of the light beam emitted by the lighting module in order to obtain the low beam. The wall, for its part, forms a cut-off line via its rim, this cut-off line being capable of limiting the laterally angular range of a high beam emitted by the optical module.

Such a configuration of the rotating arbor allows easy production thereof and facilitates its modes for movable mounting within the housing. The rotating arbor is in active positions between at least two stable positions, one of which corresponds to the emission of the low beam and the other of which corresponds to the emission of the restricted lateral amplitude high beam through the middle portion/rim of the wall. The term "active position" refers to a position of the rotating arbor in which the arbor influences the emission of a desired light beam emitted by the optical module. The passing from one to the other of the stable positions in which the motor arbor induces a beam break, either vertically in the low beam position, or laterally in the position for laterally limiting the emission of a high beam, are easy to obtain by limiting the stringency of the constraints for positioning and mounting the rotating arbor within the housing. The stability of these positions can easily be obtained by means of a motor, preferably a DC motor, for driving the rotating arbor in rotation. The rotating arbor is easily held in its various stable positions by placing it in abutment in predefined positions counter to the driving thereof by the motor.

The use of a DC motor and its monitoring-control means is inexpensive.

Use may also be made of a stepper motor, which is more complex than a DC motor, but allowing greater flexibility for moving the rotating shaft from one position to another; this may prove advantageous, in particular when the optical module has at least three or four functions.

Moreover, with regard to the safety constraints involving a default positioning of the optical module in the position for emitting a low beam, a return member, which can easily be implanted within the housing, is capable of spontaneously causing maneuvering of the rotating arbor to such a position, in particular based on a modification of the steering of the electrical powering of the motor.

By way of example, the passing from the position of the low beam to the restricted lateral amplitude high beam corresponds to an angular movement of the rotating arbor of about, for example, 100° to 110°. More particularly, the angular deviation of implantation of the first cut-off member relative to the implantation of the wall is about between 100° and 110°, in such a way that the embodiment of the stop means seeking to hold the rotating arbor in the corresponding positions for operating the first cut-off member or the wall is easy to carry out.

Based on a combination between light beams emitted by respectively right and left optical modules, the middle lateral portions of the walls which these optical modules respectively comprise allow there to be delimited between them a window for passing of a restricted lateral amplitude high beam. The walls which the right and left optical modules respectively comprise are offset relative to the optical axis of the optical module, respectively to the right for the right optical module and to the left for the left optical module (in view of an axis oriented from the light sources to the front of the optical modules).

Based on a window of this type provided between the middle lateral portions of the walls, the light beam emitted by the optical module can be used in conjunction with a bending light and/or roadway correction mechanism of the lighting module and/or the optical module for selective lighting of the environment of the vehicle.

More particularly, based on control means which are simple to implement in order in particular to cause the driving in rotation of the rotating arbor to its active position corresponding to the use of the portions of the walls, a restricted lateral amplitude high beam can be emitted by the optical module in order to allow optimized lighting of a zone excluding a changing space in which there is located a travelling vehicle whose driver must not be dazzled. The opposite passing, from the position for emitting the restricted lateral amplitude high beam to the position for emitting the low beam, is obtained based on a deactivation of the motor member and on a relaxation of the return member which was previously placed under strain during the driving of the rotating arbor to the restricted lateral amplitude high beam position.

The emission of the low beam corresponds to a vertical limitation of the spread of the beam emitted by the optical module in conjunction with the cut-off line induced by the first cut-off member. In respective vertical cut-off positions of the light beam, the position of the summit crest of the wall corresponds preferably to the position of the summit crest of the first cut-off member. The vertical cut-off lines from one to the other of the first cut-off member and the wall match. The emission of the restricted lateral amplitude high beam is furthermore vertically limited by a cut-off line corresponding to the cut-off line for obtaining the low beam.

The wall is however likely to comprise a reflective coating at its summit crest, in order to increase the vertical brightness of the restricted lateral amplitude high beam.

The passing from the low beam to the restricted lateral amplitude (RLA) high beam allows a "gentle" transition from low beam to RLA. In the other direction, passing as quickly as possible from the RLA beam to the low beam tends to be favored, for safety reasons. More particularly, the lateral limitation of the amplitude of the high beam is strictly obtained once the wall is in the operating position. The various possible combinations for selective lighting of the zone to be lit by the optical module are increased as a result in association with a bending light and/or roadway correction mechanism.

By way of non-limiting example, as the first cut-off member and the wall are focused on the optical axis of the lighting module, the vertical cut-off lines have a height of between 0.5 mm and 0.6 mm, and in particular 0.54 mm, with a focal lens of about 43 mm.

The rotating arbor can be maneuvered in rotation to a position corresponding to the emission of a second additional beam which may be formed either by a high beam or by a motorway light beam. In this case, the rotating arbor can be maneuvered in rotation between three stable positions: a middle position corresponding to the emission of the low beam and two other end positions, one corresponding to the emission of the restricted lateral amplitude high beam and the other either to an emission of a motorway beam or, and preferably, to the emission of a high beam. The passing from the position for emitting the low beam, which constitutes a reference position due to the spontaneous return induced by the return member, to the position for emitting the restricted lateral amplitude high beam is obtained by activating the motor for driving the rotating shaft in a first direction of rotation. The passing from the position for emitting the low beam to the position for emitting the motorway beam or the high beam is obtained by activating the motor for driving the rotating shaft in an opposite direction of rotation to the preceding direction.

More particularly still and according to another, preferred variant, the rotating arbor can be maneuvered into an, in particular cut-off member-exempt, position in which what is known as a second additional light beam is a high beam. In this case, it is desirable for the lighting module to be mounted on the housing so as to move between a position for emitting the low beam and a position for emitting a raised low beam, in which the optical module is capable of emitting a motorway beam.

Preferably, the position of the rotating arbor corresponding to the emission of the low beam is an intermediate position between the positions of the rotating arbor corresponding respectively to the emission of the first additional light beam and to the emission of the second additional light beam.

More preferably, the driving in rotation of the rotating arbor for passing from one to the other of the positions allocated for the emission of one or the other of the additional light beams emitted by the optical module is carried out from the reference position corresponding to the emission of the low beam, and by driving in rotation of the rotating arbor in respective directions until the position for emitting the corresponding additional light beam is reached. These positions are stable positions maintained based on a placement in abutment of the rotating arbor counter to the driving thereof in rotation by the motor.

The passing between any one of the positions of the rotating arbor corresponding to an additional light beam to the position corresponding to the low beam is in particular caused by an, in particular resilient, return member such as a torsion spring or the like, following a modification of the electric control of the motor.

The headlamp can also comprise means for detecting the environment of the vehicle, and in particular the presence of another vehicle driving in the same lane while being tailed or in the overtaking phase and/or driving in a lane in the opposite direction of traffic. Detection means of this type consist for example of optoelectronic means, such as a camera or the like, optionally associated with means for communicating by waves, such as satellite positioning means, GPS (Global Positioning System) or similar means, radars, or even means for communicating by waves using a cellular telephony network. These means may be in the optical module, in the headlamp or mounted in the vehicle in an appropriate zone (behind the windscreen, etc.).

Computation means are preferably associated with detection means of this type, in order to increase the relevance of the information provided by the detection means and to optimize the recognition of the zone to be lit while excluding the space occupied by another vehicle whose driver must not be dazzled.

With a view to the desired optimization of the lighting of a zone excluding a changing space in which there is located a travelling vehicle whose driver must not be dazzled, the optical module also comprises means for movability of the lighting module and/or the optical module that are capable of obtaining a bending light function and/or a roadway correction function, in association with the implementation of the rotating shaft to one or the other of its stable positions.

More particularly, the driving in rotation of the rotating arbor to any one of its positions for emitting a dedicated light beam is associated with means for detecting the environment of the vehicle and with a bending light mechanism and/or with a roadway correction mechanism.

The invention also relates to a pair of headlamps, comprising two bifunctional headlamps each with an optical module capable of emitting a low beam and a restricted lateral amplitude high beam.

The invention also relates to a pair of headlamps, comprising two quadrifunctional headlamps.

The invention also relates to a pair of headlamps, comprising two headlamps equipped with optical modules, the combination of two optical modules being capable of emitting a high beam with:

the two headlamps each with a module capable of emitting a restricted lateral amplitude high beam, or one of the headlamps having a module capable of emitting a restricted lateral amplitude high beam, and the other headlamp having a module capable of emitting a high beam.

These and other objects and advantages of the invention will be apparent from the following description, the accompanying drawings and the appended claims.

BRIEF DESCRIPTION OF THE ACCOMPANYING DRAWINGS

The present invention will be better understood on reading the description which will be given of it based on an exemplary embodiment, in conjunction with the figures on the appended sheets, in which:

FIG. 3 to FIG. 5 are perspective illustrations of a mechanism for maneuvering a movable cover plate fitted to an optical module in accordance with a headlamp of the present invention;

FIG. 6 and FIG. 7 are perspective illustrations of a couple of movable cover plates which an optical module of the present invention comprises, respectively allocated to an optical module and to an optical module of the respectively right and left headlamps fitted to the first vehicle;

DETAILED DESCRIPTION OF THE PREFERRED EMBODIMENTS

Figure 1:
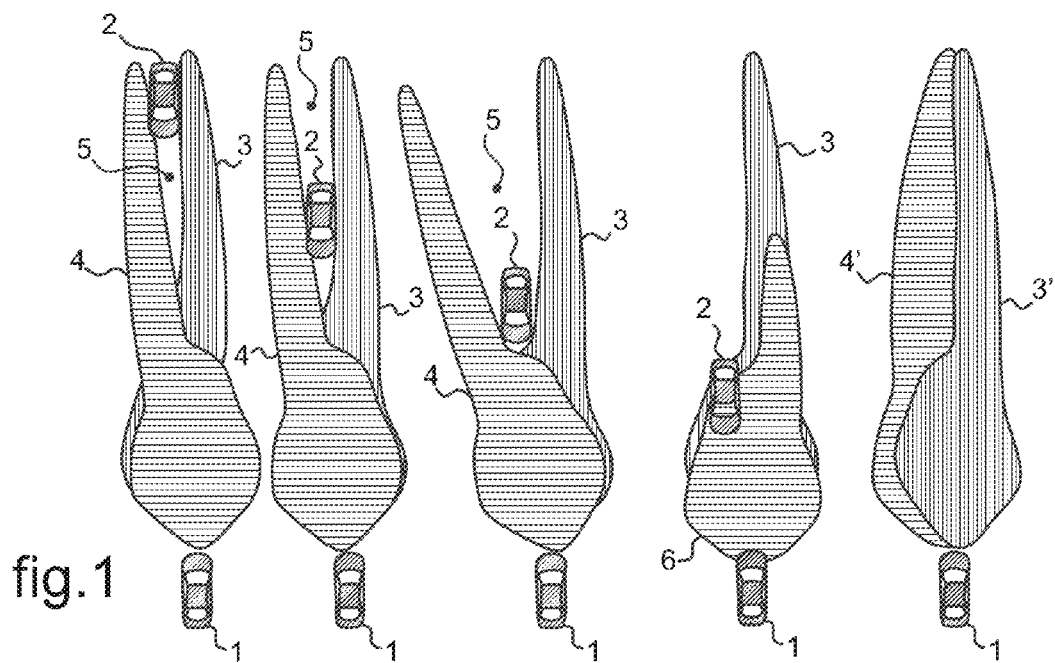
FIG. 1 are successive illustrations of modes for the lighting of a traffic lane by a first vehicle equipped with an optical module of the present invention, taking account of the presence of a second vehicle driving in an opposite traffic lane.

In FIG. 1, a first vehicle 1 is passing a second vehicle 2 driving in a traffic lane in the opposite direction. It is necessary not to dazzle the driver of the second vehicle 2, and yet to seek to optimize the lighting of the area surrounding the first vehicle 1. In a first approach phase, the headlamp of the first vehicle emits right 3 and left 4 high beams which are restricted in lateral amplitude (referred to hereinafter as RLA high beams for the sake of brevity), in order to create a shadow zone or space 5 in the space occupied by the second vehicle 2, while at the same time optimizing the lighting of the surrounding zone. In the following two steps, the emission of the left high beam 4, the lateral amplitude of which is restricted, is gradually tilted to the left to avoid dazzling the driver of the second vehicle 2 during the approach. According to the following step, the left optical module of the first vehicle 1 emits a low beam 6 when the second vehicle 2 draws near. In a final step, when the second vehicle 2 has moved away, the right and left optical modules of the first vehicle 1 both emit high beams 3',4' without restriction of lateral lighting. The result of these provisions is that the lighting of the zone surrounding the first vehicle 1 is optimized, without causing dazzling of the driver of the second vehicle 2, on the one hand based on a lateral restriction of the high beams emitted by at least one of the optical modules fitted to the first vehicle 1, and on the other hand based on the tilting of the light beam 4 emitted by the left optical module.

Figure 2:
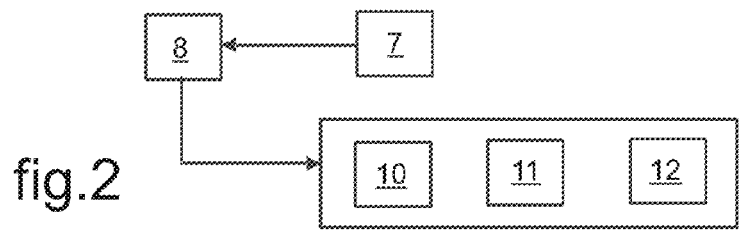
FIG. 2 is a diagram illustrating various means which the optical module of the present invention comprises in order to obtain selective lighting in accordance with the modes represented in FIG. 1.

In FIG. 2, the optical module implements detection means 7, such as optoelectronic means or the like, which are associated with computation means 8. The optical module also implements lighting function control means 9 dedicated to the emission of light beams by the right and left optical modules of the first vehicle 1. The lighting functions combine a bending light device 10, a mechanism 11 for selecting the emission of a specific light beam, and a roadway correction mechanism 12, or even a mechanism for raising the passing beams emitted by the optical modules. Each of these lighting functions 10,11,12 is likely to be implemented independently from one optical module to the other fitted to the first vehicle 1, depending on the desired respective positions of movable cover plates which the right and left optical modules of the first vehicle 1 comprise.

In FIG. 3 to FIG. 10, the mechanism 11 for selecting the emission of a specific light beam comprises a movable cover plate which is configured as an arbor or shaft 13 which is mounted so as to rotate on a frame 14 integrated into a housing 15 of the optical modules 16. More particularly in FIG. 8 to FIG. 10, the housing 15 accommodates a lighting module combining a light source 17 and an optical system composed of a reflector 18 and a lens 19.

Figure 8:
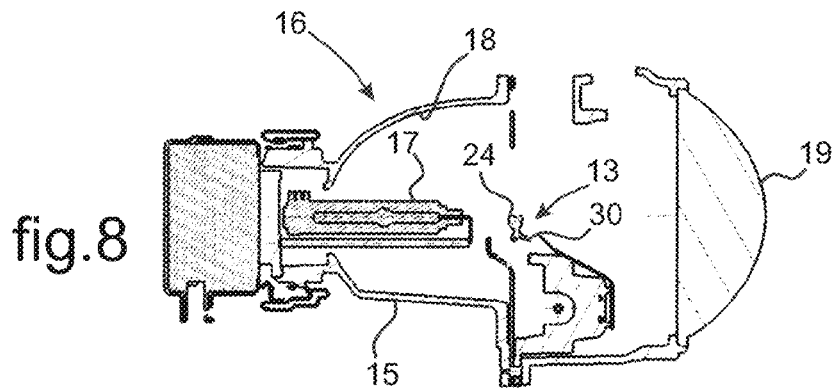
FIG. 8 to FIG. 10 are longitudinal sections of an optical module of the present invention.
Figure 9:
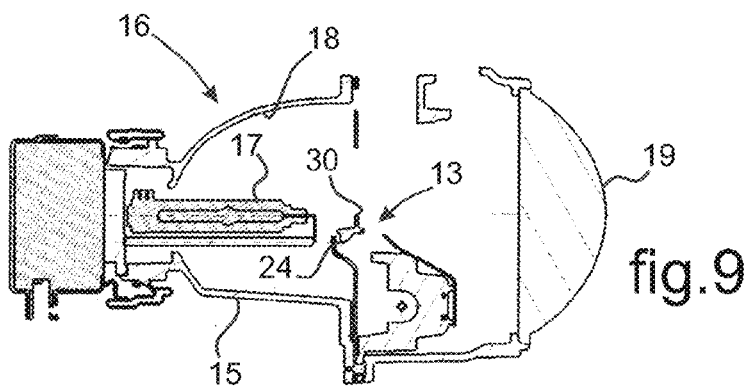
Figure 10:
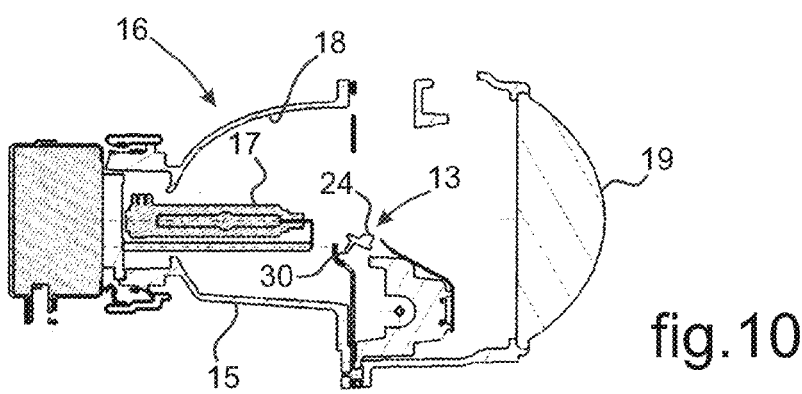

FIGS. 8 to 10 show the optical modules which are intended to be integrated subsequently into a lighting device or headlamp.

The rotating shaft 13 is interposed between the light source 17 and the lens 19 in order to modify the range and/or the lateral amplitude of the light beam emitted by the optical module 16.

Figure 3:
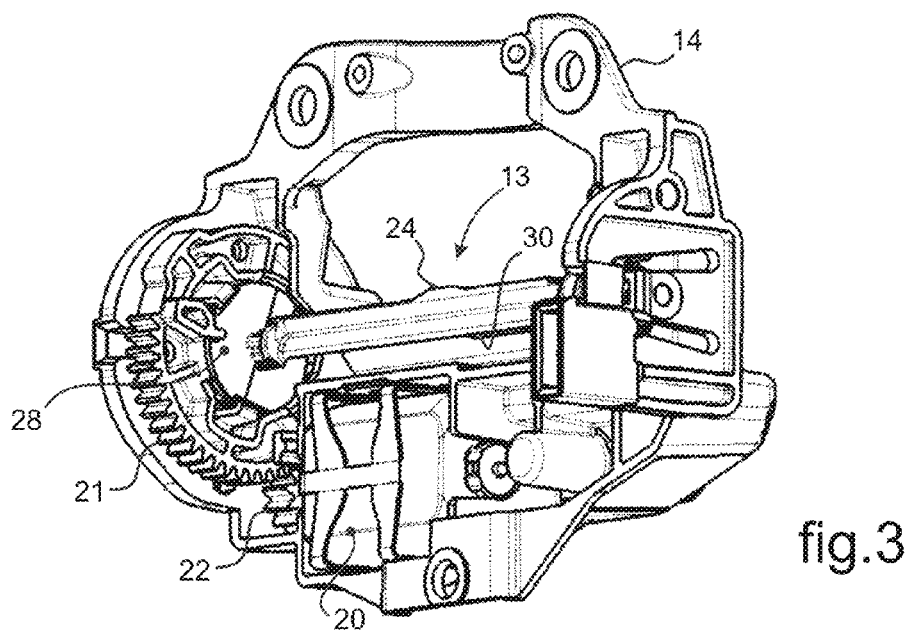

More particularly in FIG. 3 to FIG. 5, the rotating shaft 13 is shown in the intermediate position for the emission of a low beam by the optical module 16. The rotating shaft 13 is capable of being driven in rotation by means of a motor 20, preferably a DC motor, via a transmission mechanism combining toothed wheels 21,22. The rotating shaft 13 is automatically placed in the position for the emission of a low beam 6 by the optical module 16, based on a modification of the electric control of the motor 20 and on spontaneous driving of the rotating shaft 13 by means of a resilient return member 23, such as a torsion spring or the like. More particularly, when the rotating shaft 13 is driven by the motor member 20 in one or the other of its directions of rotation, the resilient return member 23 is placed under stress, in such a way that the release thereof spontaneously causes positioning of the rotating shaft 13 for emission of the low beam 6 by the optical module 16. The motor member 20 is provided for driving the rotating shaft 13 in one and the other of its directions of rotation, to stable positions for emitting additional light beams, including a high beam 3';4' and a restricted lateral amplitude high beam 3,4. The rotating shaft 13 is held in each of its stable positions corresponding to the emission of the various light beams based on a stops system counter to an activation of the motor member 20 for the positions corresponding to the emission of the additional light beams 3,4; 3',4' and counter to the return member 23 for emission of the low beam 6.

FIG. 6 and FIG. 7 show more particularly rotating shafts 13 respectively allocated to a left optical module and to a right optical module fitted to the first vehicle. These rotating shafts 13 have a constant global profile of rectangular shape. Each of these rotating shafts 13 comprises a first cut-off member 24 which is configured as an upper double-edged cover plate (for further details concerning this type of double cover plate, reference may be made, for example, to patent EP-1 584 862). The first cut-off member 24 induces an oblique cut-off line of the light beam emitted by the optical module 16, for emission of the low beam 6. The first cut-off member 24 is automatically placed in the intermediate position for focusing on the optical axis of the lighting module under the effect of the return member 23, with which the rotating shaft 13 is engaged. For this purpose, one of the ends of the rotating shafts 13 comprises a shank 25 for receiving of the return member 23 onto which the return member is threaded. Formed at this same end is a groove 26 along which move guide members 27 which the frame 14 comprises, as may be seen in FIG. 5. A stop system 28 at two positions of the rotating shafts 13 cooperates with antagonistic stops which the frame 14 comprises, in order to hold the rotating shafts 13 in their various respective positions. At the other end of the rotating shafts 13, an arm 29 allows pre-positioning of the resilient return member 23.

Moreover, each of the rotating shafts 13 comprises a second cut-off member 30 configured as a wall, which is laterally offset to the right for the rotating shaft 13 allocated to the left optical module and to the left for the rotating shaft 13 allocated to the right optical module. Such offsets must be taken into account with regard to the position of the optical axis of the lighting module. These walls 30 are (substantially) constant in height, while being angularly offset relative to the corresponding first cut-off member 24, by an angle of about between 100° and 110°. The walls 30 in the active position are capable of inducing, from their lateral portion 31 closest to the optical axis of the lighting module, a lateral amplitude cut-off of a high beam emitted by the optical module. The term "active position" of the wall 30 refers to its position corresponding to focusing thereof on the axis of the lighting module. This active position of the wall 30 results from the driving of the rotating shaft 13 in the corresponding direction of rotation. In the lateral cut-off active position of the high beam, the position of the summit crest 32 of the wall 30 corresponds to the position of the summit crest 24' of the first cut-off member 24. The wall 30 induces not only an amplitude lateral cut-off of the high beam 3,4, but also a vertical cut-off corresponding to an emission cut-off of a low beam 6. By way of example, as the first cut-off member 24 and the wall 30 are focused on the axis of the lighting module, the vertical cut-off lines are about 0.54 mm.

In FIG. 8, the rotating shaft 13 is in the spontaneous position for emitting a low beam 6. The motor member 20 is deactivated and the return member 23 causes the rotating shaft 13 to pass from any other position of an additional light beam 3,4; 3',4' emitted by the optical module 16 to its intermediate position corresponding to the emission of a low beam 6. In this position, the first cut-off member 24 is held in a stable manner by the resilient return member 23. The first cut-off member 24 is active, and the range of the light beam emitted by the optical module 16 is vertically limited by the summit crest 24' of the first cut-off member 24 for emission of a low beam 6.

Figure 11:
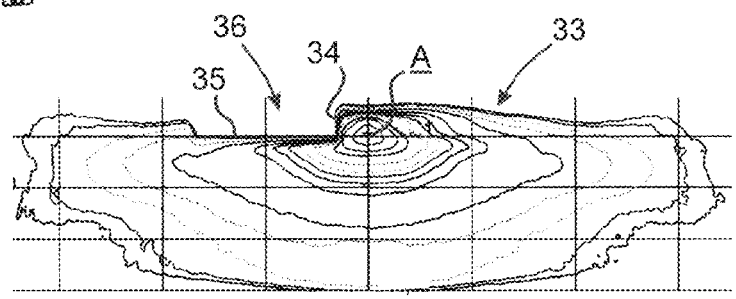
FIG. 11 is a diagram illustrating a light flux emitted by an optical module according to the present invention, in a position of the movable cover plate corresponding to a lateral amplitude cut-off of a high beam.

In FIG. 9, the rotating shaft 13 is maneuvered in rotation in a first direction until it is brought to a standstill and held supported in a stable manner against a first stop member. This maneuvering in rotation places the wall 30 in the active position for restricting the lateral amplitude of a high beam 3,4 emitted by the optical module 16, and in the vertical cut-off position in this lateral cut-off zone. In FIG. 11, the light beam 33 emitted by a right optical module corresponds to a restricted amplitude high beam 3,4, both laterally 34 via the portion 31 of the wall 30 that is closest to the optical axis A of the lighting module, and vertically 35 in this same zone 36 for vertical amplitude cut-off 34 of the high beam. The zone to be lit surrounding the first vehicle 1 is optimized, by restricting the emission of light to a space 5 in which the presence of the second vehicle 2 is detected. Based on a variation in the inclination of the lighting module or the optical module via turning bending light device 10 and/or roadway correction mechanism 12 functions, this preserved lighting space 5 can move as a function of the movement of the second vehicle 2 whose driver must not be dazzled.

In FIG. 10, the rotating shaft 13 is maneuvered in an opposite direction of rotation to the preceding direction, until it is brought to a standstill and held supported in a stable manner against a second stop member. If no second vehicle 2 is detected, this maneuvering in rotation places the rotating shaft 13 in such a way as to clear the light beam emitted by the optical module 16, in order to optimize the lighting of the environment of the first vehicle 1 as a result of the emission of a high beam 3',4'.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. A headlamp for a motor vehicle, said headlamp comprising:
at least one optical module capable of emitting a plurality of light beams, including a low beam and at least one additional light beam, said at least one optical module being accommodated within a housing of the headlamp and combining a light source and an optical system, the optical module being equipped with a cover plate which can be moved between at least two positions, said cover plate being configured along a shaft mounted so as to rotate in said at least one optical module and driven in rotation at least by a motor, said cover plate comprising a plurality of cut-off profiles of light beams emitted by said at least one optical module, wherein said shaft comprises at least one first cut-off member configured as a double-edged cover plate providing an oblique cut-off for emission of the low beam, and at least one second cut-off member configured as a wall of substantially constant height, angularly offset relative to said at least one first cut-off member and providing at least one substantially vertical cut-off line for emission of a high beam corresponding to a first additional light beam.

2. The headlamp according to claim 1, wherein said wall is a cut-off member, a substantially vertical edge of which provides a vertical amplitude cut-off line for emission of a restricted lateral amplitude high beam forming said first additional light beam.

3. The headlamp according to claim 1, wherein in respective cut-off positions, the upper parts of the cut-off members of the shaft are substantially positioned at the same height.

4. The headlamp according to claim 1, wherein in respective cut-off positions, the upper parts of the cut-off members of the shaft 13 are positioned at different heights.

5. The headlamp according to claim 3, wherein the relative positioning of the cut-off members in respective cut-off positions is adjusted by selecting the height of the wall and/or with the aid of a correction system fitted to said at least one optical module.

6. The headlamp according to claim 1, wherein said wall, being in particular focused substantially on an optical axis of said at least one lighting module, a cut-off corresponding to an upper edge of said wall has a height of at least 0.5 mm or at least 0.6 mm, in particular at least 0.54 mm.

7. The headlamp according to claim 1, wherein said rotating shaft can be maneuvered in rotation to a position corresponding to the emission of a second additional beam which is either a high beam or a motorway beam.

8. The headlamp according to claim 7, wherein said position of the rotating shaft corresponding to the emission of the low beam is an intermediate position between the positions of the rotating shaft corresponding respectively to the emission of the first additional light beam and to the emission of the second additional light beam.

9. The headlamp according to claim 1, wherein said driving in rotation of the rotating shaft for passing from one to the other of the positions allocated for the emission of one or the other of the additional light beams is carried out from the reference position corresponding to the emission of the low beam, and by driving in rotation of the rotating shaft in respective directions until the position for emission of the corresponding additional light beam is reached, these positions being stable positions maintained based on a placement in abutment of the rotating shaft counter to the driving thereof in rotation by the motor.

10. The headlamp according to claim 1, wherein said passing between any one of the positions of the rotating shaft corresponding to an additional light beam to the position corresponding to the low beam is caused by a resilient return member, in particular following a modification of the steering of an electric control of the motor.

11. The headlamp according to claim 1, wherein said wall has an upper edge, the rim of which is at least partly reflective or made reflective by a reflective coating.

12. The headlamp according to claim 1, wherein said at least one optical module is a trifunctional module, with a rotating shaft provided with three cut-off members, in order to emit, depending on the position of the rotating shaft, a low beam, a high or motorway beam, and a restricted lateral amplitude high beam.

13. The headlamp according to claim 1, wherein said at least one optical module is a quadrifunctional module, with a rotating shaft provided with four cut-off members, in order to emit, depending on the position of the rotating shaft, a low beam, a high beam, a restricted lateral amplitude high beam and a motorway beam.

14. A pair of headlamps at a front of a vehicle, two trifunctional headlamps according to claim 1, each having an optical module emitting the same three beams, or not, in particular
  either two headlamps each with a module emitting a low beam, a high or motorway beam, and a restricted lateral amplitude high beam,
  or one headlamp having an optical module emitting a low beam, a high beam, and a restricted lateral amplitude high beam, and the other headlamp having an optical module emitting a low beam, a motorway beam, and a restricted lateral amplitude high beam.

15. A pair of headlamps at the front of a vehicle, two headlamps according to claim 1, each of said at least one optical modules fitted to said headlamps being capable of emitting a restricted lateral amplitude high beam, in such a way that the spacing between these two beams is adjustable as a function of the distance and/or the number of vehicles in the environment close to the vehicle equipped with said pair of headlamps.

\* \* \* \* \*